United States Patent [19]

Adelman

[11] 3,998,917
[45] Dec. 21, 1976

[54] CERAMIC COMPOSITIONS AND ARTICLES MADE THEREFROM

[75] Inventor: Robert Leonard Adelman, Wilmington, Del.

[73] Assignee: E. I. Du Pont de Nemours and Company, Wilmington, Del.

[22] Filed: Feb. 12, 1975

[21] Appl. No.: 549,205

Related U.S. Application Data

[63] Continuation-in-part of Ser. No. 356,837, May 3, 1973, abandoned, which is a continuation-in-part of Ser. No. 162,277, July 13, 1971, abandoned, which is a continuation-in-part of Ser. No. 850,617, Aug. 15, 1969, abandoned.

[52] U.S. Cl. .................................. 264/63; 264/212; 264/216; 264/236; 264/331; 264/332; 260/29.6 TA
[51] Int. Cl.² ........................................ C04B 35/64
[58] Field of Search ............ 264/63, 212, 236, 216, 264/331, 332; 260/29.6 TA

[56] References Cited
UNITED STATES PATENTS

| | | | |
|---|---|---|---|
| 2,853,461 | 9/1958 | Padbury et al. ...................... 260/41 |
| 2,952,877 | 9/1960 | Park .................................... 264/63 |
| 2,966,719 | 1/1961 | Park .................................... 264/63 |
| 3,004,197 | 10/1961 | Rodriguez et al. ................. 317/258 |
| 3,005,244 | 10/1961 | Erdle et al. ....................... 260/42.11 |
| 3,243,397 | 3/1966 | Herkimer et al. ................. 260/29.3 |
| 3,318,840 | 5/1967 | Weston ............................ 260/42.11 |
| 3,472,803 | 10/1969 | Andrews et al. ................. 260/17 R |
| 3,953,562 | 4/1976 | Hait et al. ............................ 264/63 |

OTHER PUBLICATIONS

B346,044, Jan. 1975 Smith et al., 264/63.

*Primary Examiner*—Lucille M. Phynes

[57] ABSTRACT

This invention relates to slurry compositions which are adapted for the formation of ceramic articles. The compositions comprise ceramic particulate matter blended with an aqueous dispersion of an internally plasticized thermosetting resin. These compositions are formed into green (unfired) ceramic tapes which can be ultimately used for electronic purposes wherever fired rigid ceramic bodies are required. The use of these compositions overcomes many of the prior disadvantages relating to dimensional stability, flexibility, atmospheric stability and compatibility with a wide variety of conventional metallizing pastes.

6 Claims, No Drawings

CERAMIC COMPOSITIONS AND ARTICLES MADE THEREFROM

CROSS-REFERENCE TO RELATED APPLICATION

This is a continuation-in-part of my now abandoned application Ser. No. 356,837 filed May 3, 1973, which in turn is a continuation-in-part of application Ser. No. 162,277, filed July 13, 1971, now abandoned, which is in turn a continuation-in-part of application Ser. No. 850,617, filed Aug. 15, 1969, now abandoned, the disclosures all of which are hereby incorporated by reference.

BACKGROUND OF THE INVENTION

This invention relates to green (unfired) ceramic articles and to compositions for making the same.

In the manufacture of ceramics, the evaporation of volatile constituents from a slurry composition of inorganic materials has been accomplished heretofore. U.S. Pat. No. 2,486,410 (Howatt) describes the preparation of leather-hard sheets containing finely divided ceramic and small amounts of organic solvent-soluble or water-soluble binders. The sheets are in a leathery, flexible form only as a result of some retained solvent or water. However, as pointed out in U.S. Pat. No. 2,952,877 (Park), it is difficult to retain a sufficient amount of water in the sheets on storage to keep them moldable or to control dimensional characteristics. The above-mentioned Park patent describes the use of a mixture containing, in addition to ceramic material, (a) a substantially water-soluble polymeric organic binder (e.g., polyvinyl alcohol), (b) a substantially water-soluble compatible organic plasticizer for said binder, and (c) a relatively small amount of water to give a highly viscous paste. This mixture was extruded into slabs and dried to form flexible sheets comprising ceramic particulate material, prior to subsequent stamping and firing to vitrified products.

This latter approach has also had its problems. Careful control over the amount of water present is required to permit uniform extrusion. Careful drying conditions are required to prevent loss of plasticizer and subsequent loss of flexibility of the extruded slab. The extruded product has limited storage stability due to the loss of the relatively volatile organic plasticizer. In addition, the extruded product must be stored under low humidity conditions to prevent the dry slab from taking up more water which will lead to poor control of dimensional characteristics during subsequent processing. The high water pickup is, of course, due to the use of substantially water-soluble polymeric binders and plasticizers. A later Park patent, U.S. pat. No. 2,966,719, avoided these difficulties of the water-based system, by utilizing a volatile organic solvent system wherein the tape is formed in a casting process. This method particularly differs from Howatt in that the cast ceramic tape is made flexible by the use of a compatibly plasticized thermoplastic binder resin rather than the retention of solvent. This Park patent also prefers the inclusion of an organic solvent-soluble wetting agent.

This latter Park method has also experienced several difficulties, some of which are characteristic of an organic solvent system. These include potential environmental pollution, flammability and toxicity hazards. Also, in the use of very soft thermoplastic binder the tapes are particularly sensitive to distortion on handling or roll-up on storage since the polymers are subject to creep even under low applied stress. When an external plasticizer is used, slow volatilization of the plasticizer on extended storage leads to stiffening and embrittlement. In addition, the use of an organic-soluble thermoplastic binder system provides unfired tapes which are highly sensitive to most organic solvents.

U.S. Pat. No. 3,472,803 discloses a composition for slip casting sheets to produce ceramic articles comprising an aqueous polymer latex emulsion. The latex emulsion is an uncompounded or uncured rubber having pronounced thermoplastic properties. The slurry compositions of the present invention are readily distinguishable in that the resin components are thermosetting giving the unfired films formed therefrom improved dimensional stability.

On of the major uses of the ceramic tapes is in the electronic industry. Many electronic component manufacturers print their circuitry on the ceramic tape before firing the tapes. The solvent sensitivity of these tapes limit the choice of printing compositions which the manufacturer may use. Accordingly, it is the purpose of this invention to provide ceramic slurry compositions which can be formulated into ceramic tapes and fired to ceramic articles without the above-described difficulties of the prior art. Moreover, the ceramic tapes and articles produced by this invention are particularly adaptable for use in the electronic industry.

SUMMARY OF THE INVENTION

This invention relates to a slurry composition which is adapted for the formation of ceramic articles comprising ceramic particulate blended with an aqueous dispersion of an internally plasticized thermosetting resin. The compositions can contain small amounts of optional ingredients which include emulsion stabilizers, wetting agents, coalescing aids and antifoaming agents. Specifically, the slurry compositions of the present invention are adapted for the formation of flexible green ceramic articles having an initial modulus below 20,000 psi and have excellent swelling characteristics. They comprise ceramic particulate matter blended with an aqueous dispersion of an internally plasticized thermosetting resin, there being 85–97 parts of said ceramic particulate matter to 3–15 parts of said resin, the ceramic particulate matter having a particle size no larger than 44 microns.

Preferred internally plasticized thermosetting resins for use in the slurry composition of the invention comprise the polymerization product of unsaturated esters selected from the group consisting of esters of acrylic acids, methacrylic acids, and the vinyl esters of saturated carboxylic acids, and a cross-linkable comonomer selected from the group consisting of glycidyl methacrylate and the n-methylolamides of acrylic acid, methacrylic acid and itaconic acid. Additional internally plasticizing comonomers, e.g., ethylene, butyl acrylate, vinyl 2-ethylhexoate, dialkyl and/or dibutyl maleate, may be optionally added to further improve the flexibility of the green ceramic article.

In addition, the invention involves a process for preparing ceramic articles from a slurry composition comprising ceramic particulate blended with an aqueous dispersion of a internally plasticized thermosetting resin, forming a film on a smooth supporting surface from said slurry, and removing the aqueous medium by heating to provide a flexible ceramic film.

DETAILED DESCRIPTION

The novelty of the slurry composition of this invention lies in the use of an aqueous dispersion of an internally plasticized thermosetting resin. An aqueous system is utilized to avoid the difficulties of an organic solvent system including atmospheric pollution, flammability an toxicity. Furthermore, the ease of preparing aqueous systems and the subsequent handling and formulating of ceramic articles therefrom is much more easily accomplished than from organic solvent systems.

The internally plasticized thermosetting resins useful in the slurry composition of this invention comprise the polymerization product of unsaturated esters selected from the group consisting of esters of acrylic acids, methacrylic acids, and the vinyl esters of saturated carboxylic acids, and a cross-linkable comonomer selected from the group consisting of glycidyl methacrylate and the n-methylolamides of acrylic acid, methacrylic acid and itaconic acid. Suitable resins are medium to high molecular weight, water-insoluble polymers, wherein the level of internal plasticization is indicated by an initial modulus in thermoset films of said resins of less than about 20,000 psi, and preferably less than 12,000 psi. The term "internally plasticized" designates a known mechanism of plasticization wherein the plasticizing comonomers are incorporated into the polymer chain making the plasticizer and polymer into a single chemical specie. For the purposes of the present invention any comonomer which when copolymerized with the major component monomer of the resin used significantly lowers the initial modulus of green films thereof may be considered a plasticizing comonomer and the film may be considered to be internally plasticized. In the resins useful in the slurry composition of the invention, internal plasticization is present in the polymerization product of unsaturated esters selected from the group consisting of esters of acrylic acids, methacrylic acids, and the vinyl esters of saturated carboxylic acids. Additional internal plasticization and enhanced flexibility of the unfired (green) articles may be provided by incorporation of from 0-80% internally plasticizing comonomers, e.g., ethylene, butyl acrylate, vinyl-2-ethylhexoate and dialkyl and/or dibutyl maleate. Suitable internally plasticizing comonomers will be incorporated into the polymer chain as described in "Technology of Solvents and Plasticizers", A. K. Doolittle, Wiley, New York (1954). The properties of the internally plasticized resins provide distinct advantages over resins wherein an external plasticizer is in admixture therewith. The internally plasticized resin is not subject to loss of flexibility, due to volatilization, extraction or oxidation of a separate plasticizer in admixture with a polymer component. The thermosetting or thermosettable properties of the resins are provided by cross-linkable comonomers of glycidyl methacrylate or an n-methylolamide of an acid selected from the group consisting of acrylic, methacrylic and itaconic acids, which on drying, e.g., by heating at moderately elevated temperatures (50°-150° C.) over short periods of time (0.1-15 minutes), cross-link to provide improved dimensional stability of unfired (green) ceramic articles formed from the slurry compositions of the invention. The thermosetting nature of the resins combine with the internally plasticized properties to provide flexible cured, unfired (green) ceramic articles or films, wherein the slurry composition is fused or coalesced into large molecularly immobilized units so that diffusion across particle boundaries is essentially prevented. The curing of the resins is accomplished by cross-linking polymer chains to form three dimensional networks of enormous molecular weight by the introduction of covalent (and in some instances ionic) bonds between previously unbonded polymer chains. In contrast to thermoplastic resins, the thermosetting resins do not flow or creep on subsequent heating and become dimensionally unstable, and due to the internally plasticized properties they are not brittle like other thermosetting resins at room temperature, but may be readily handled without chipping or breaking.

Examples of polymers which are useful in this invention are vinyl acetate copolymers containing 5–50% of an internally plasticizing comonomer (e.g., ethylene, butyl acrylate, vinyl 2-ethylhexoate, dibutyl maleate) and 0.1–10% of a comonomer which after polymerization is capable of cross-linking the polymer by heat-treatment (e.g., N-methylol acrylamide). Additionally, the acrylate polymers and ethylene copolymers of Table I, and also the acrylic esters such as "Rhoplex" E-32 or "Rhoplex" HA-8, as described in Rohm & Haas Bulletin TP-125a, which are commercially available, are suitable in the compositions of the invention.

TABLE I

ORGANIC POLYMERIC BINDER

| I-1 Acrylate Polymer Component | Wt. Percentage | |
|---|---|---|
| | Operable Range | Preferred Range |
| Alkyl* acrylate ester | 50–75 | 60–70 |
| Alkyl* methacrylate ester | 25–50 | 30–35 |
| N-methylolamides of acrylic and methacrylic acid | 0.1–10 | 0.5–5.0 |
| *Alkyl is methyl, ethyl, propyl, butyl and 2-ethylhexyl | | |

| I-2 Ethylene Copolymers Component | Wt. Percent |
|---|---|
| Ethylene | 50–85 |
| Comonomers: vinyl ester of a lower (1–8 carbon) saturated aliphatic monobasic carboxylic acid; methyl-2 butyl acrylate; or methacrylate; dimethyl-2-dioctyl maleate; and/or dimethyl-2-dioctyl fumarate | 15–50 |
| Crosslinkable comonomer: N-methylolamides of acrylic acid, methacrylic acid, itaconic acid and/or glycidyl methacrylate | 0.1–10 |

These specific examples of suitable internally plasticized thermosetting resins are not meant to be limiting or inclusive. Other well known internally plasticized thermosetting resins may be utilizied in this invention, and small amounts of acid catalyst may be added to accelerate the cross-linking reaction. The thermosetting resin selected may be high or low in viscosity but must be volatilizable during firing to form a rigid ceramic. The resin must provide flexible green sheets. The type and amount of thermosetting resin is selected so that the flexibility of the resultant green sheet is such that it exhibits an initial tensile modulus below 20,000 psi. It is preferred that the initial tensile modulus be below 15,000 psi.

The polymers which are useful in this invention may most readily be defined by stating that they contain from 0.1 to 10 weight percent of a comonomer which after polymerization is capable of cross-linking the polymer by heat treatment; a major component comonomer which may be (a) vinyl acetate, (b) esters of acrylic acid and a 1 to 8 carbon alcohol, or (c) ethylene; and a third comonomer which serves to internally plasticize the copolymer after cross-linking in the case of (a), (b) and (c) the cross-linkable commonomer can provide the internal plasticization.

In the case of (a) where vinyl acetate is the comonomer on which the polymer is based the polymer will contain from 50 to 95 weight percent vinyl acetate, from 0.1 to 10 weight percent of the cross-linkable comonomer and from 4.9 to 49.9 weight percent of an internally plasticizing comonomer such as ethylene, or esters of 1 to 8 carbon atom alcohols and any of maleic acid, fumaric acid, or acrylic acid or 4 to 8 carbon alcohol esters of methacrylic acid.

In the case (b) where an ester of acrylic acid is the comonomer on which the polymer is based the polymer ordinarily will contain from 50 to 98 weight percent, preferably from 50 to 75 weight percent, and more preferably from 60 to 70 weight percent of an ester of a 1 to 8 carbon atom alcohol and acrylic acid; from 0.1 to 10 weight percent of a cross-linkable comonomer, and the remainder a plasticizing comonomer such as ethylene, esters of 1 to 8 carbon atom alcohols and maleic acid, fumaric acid, and esters of methacrylic acid and an alcohol having up to 8 carbon atoms but having at least 2 more carbon atoms than the alcohol portion of the acrylic acid ester.

In case (c) where ethylene is the major comonomer on which the polymer is based the polymer ordinarily will contain from 50 to 84.9 weight percent ethylene, from 15 to 49.9 weight percent of a plasticizing monomer such as a vinyl ester of a 1 to 8 carbon atom saturated aliphatic monobasic carboxylic acid, and esters of 1 to 8 carbon atom alcohols and acrylic acid maleic acid or fumaric acid.

In all of the above cases (a), (b) and (c) the preferred cross-linkable comonomer is selected from the class consisting of glycidyl methacrylate and the n-methylol amides of acrylic acid, methacrylic acid or itaconic acid.

A wide variety of ceramic materials may be utilized in this invention. Inorganic materials consisting chiefly of alumina, sateatite, zircon, aluminum silicate, zirconium dioxide, titanium dioxide, magnesium silicate, barium titanate, beryllia, etc., and various combinations thereof may be employed. Fluxes such as the phosphates, borides or modifying oxides of lead, iron or tin may be added. The ceramic materials selected for the slip composition should be of a small particle size, in order of −325 mesh (44 micron maximum) or smaller (U.S. Standard Sieve size). Smaller particle sizes on the order of −325 mesh facilitate the formation of a dense, ceramic-particulate film and aid in providing a dense fired product, which is desired for electronic uses. Larger particles result in a fired article of substantially less dielectric strength, frequently of a porous or permeable nature, and even of a fractured or striated complexion.

Optional additives to the slurry compositions include wetting agents, antifoam agents, emulsion stabilizers and coalescing aids. A wide variety of wetting agents for the ceramic particles can be used, such as polyphosphates, tetraphosphates, silicates, monomer organic surfactants such as substituted polyethylene glycols or anionic organic surfactants such as sodium salts of higher aliphatic carboxylic acids (sodium stearate). Water-soluble higher molecular weight materials are effective wetting agents for the ceramic particles and also act as emulsion stabilizers. These include carboxymethylcellulose and its salts, hydroxyethylcellulose, methylcellulose, polyvinyl alcohol, substituted polyvinyl alcohols, polyvinyl pyrrolidone, and protenaceous materials (e.g., casein). The wetting agent in the slurry composition facilitates the formation of homogeneously uniform compositions having desirable spreadability. Without such an agent, excessive mixing is required and uniform films free of imperfections are difficult to form. With wetting agents, the process of formulating slurry compositions and films therefrom becomes surprisingly easy.

The antifoaming agents added to the slip composition reduce air entrapment and include compounds such as the silicones, polyglycol ethers, higher alcohols, etc. The amounts of the optional additives can be varied to suit the needs as is well known to those skilled in the art.

The aforesaid surface active wetting agents and antifoam agents, when in the slip compositions of the present invention, comprise, based on total weight of ceramic particulate matter and resin, 0.001–5% and 0.0001–3%, respectively.

In carrying out the process of this invention, the aqueous dispersion of the internally plasticized thermosetting resin is first prepared. Pre-formed internally plasticized thermosetting resins may be dispersed in water or it may be desirable to polymerize the monomers directly in an aqueous dispersion. If a casting technique is to be used in forming the films, the viscosity of the dispersion should be below 3000 cps. (measured at 25° C. on a Brookfield viscometer, 30 rpm), so that the ultimate viscosity of the ceramic slip composition will not be too high for casting.

After the aqueous dispersion of internally plasticized thermosetting resins has been prepared, this dispersion is mixed with the ceramic particulate matter. Conventional methods of compounding this slip composition may be employed but it must be thoroughly mixed to a homogeneous suspension in order to avoid undesirable striations, fractures or areas of poor strength in the fired end product. In certain instances where the resin dispersions are very stable and contain a rather high level of surface active agent, the ceramic particulate matter can be added directly to the dispersions; agitation should accompany this compounding process. Agglomerates of particles may be broken up by high shear agitation to provide surface smoothness characteristics. However, to insure that the addition of the ceramic particulate matter does not "shock— the aqueous dispersion of the polymer and cause coagulation, the ceramic particles are often predispersed in water containing a wetting agent and optionally an anti-foaming agent. This ceramic particulate suspension, after high shear treatment and removal of air by gentle stirring at room temperature or stirring under heat and vacuum, is then gently mixed with the aqueous dispersion of the thermosetting resin. If the viscosity is too high after de-airing, i.e. greater than 3000 cps. for casting, sufficient distilled water should be added and gently stirred in to reduce the viscosity to below 3000 cps. Sometimes after standing for long periods of time, the resulting compositions have a slight tendency towards settling of the ceramic particulate. This is of no problem since the particulate is readily dispersed by gentle stirring.

The ratio of ceramic particulate matter to total water in the slurry composition may vary considerably but should be as high as possible while still permitting the formation of a good dispersion and ceramic film therefrom. A high ratio of ceramic particulate matter to water reduces the shrinkage which occurs in the ceramic film during firing. On the other hand, if the film has to be prepared by extrusion techniques, a high viscosity paste is required and the water level should be very low. More specifically, if the unfired film of ceramic particulate matter and binder is prepared by casting techniques, such as by blade coating, dispersion viscosity values such as 300 cps. (at 100 rpm on the Brookfield viscometer) to 1200 cps. have been found desirable. With the wide variety of coating methods available, viscosity values of 50 to 5000 cps. (at 100 rpm on the Brookfield viscometer) and up to 20,000 cps. (at 10 rpm on the Brookfield viscometer) are applicable.

After the slurry composition is prepared, it is deposited on a smooth surface as a film, sheet or tape. This can be accomplished, as mentioned above, by any conventional coating and/or extrusion technique. One method involves use of the well known doctor blade technique. The slurry is placed on a carrier and passed under the doctor blade which has been preset to give the desired wet film thickness. The slurry flows under the blade to give a uniform film. Care must be taken to select the proper carrier since the film is usually removed for subsequent processing. The dry film must release from the carrier without tearing or stretching. The slurry should wet the carrier surface. While carriers such as glass, Du Pont "Mylar" polyester, Du Pont "Teflon" fluorocarbon, polyethylene, polypropylene, and aluminum are generally used, "Mylar," polyethylene, polypropylene, and glass are preferred. Then the film is dried by any conventional drying procedures (infra-red, air-dry, oven heat). Normally the drying rate is controlled so that it is accomplished in minimum time without causing cracking of the film. It is well known that slurries dry in two stages, i.e., a free solvent and a bound solvent stage. In the free solvent stage drying can occur rapidly without causing defects in the film. However, during the bound solvent stage, liquid must diffuse between the grains to the surface before evaporation can occur. During diffusion stresses are set up in the film which can crack the film. Any drying procedure used should minimize these stresses to avoid damage to the film. Drying can be accomplished at room temperature or by forced heating. In order to accelerate the drying process and provide cross-linking of the thermosetting resin, heat is usually applied in the range of 50°–150° C. This type of drying process generally lasts only a few minutes. Other methods of drying may require more or less time.

The film, still in contact with the supporting surface, may be removed from the surface and subjected to further processing steps such as coating, molding, stamping and the like. In the alternative, if the film is on a flexible supporting surface, the film can be rolled and stored in this manner. These well-known techniques are described in U.S. Pat. No. 2,966,719.

The invention is illustrated by the following examples. In the examples and elsewhere in the specification all parts, percentages and proportions of materials or components are by weight. A drop is approximately 0.025 gram. In Examples 1–8 and Comparative Example 1, the thickness of wet films as cast was about 10 mils, and after drying about 6–8 mils.

EXAMPLE 1

A slurry composition was prepared by adding a mixture of 190 grams alumina power (RC122BM, Reynolds Aluminum Company, 325 mesh) and 10 grams talc ("Nytal 400," U.S. Vanderbilt, Inc., 400 mesh) to an aqueous dispersion containing the following: (a) 20 grams of dispersion of 75.5% vinyl acetate/21.0% ethylene/3.5% N-methylol acrylamide terpolymer, 46.7% polymer solids, (b) 0.04 grams oxalic acid catalyst, (c) 90 grams water, and (d) 2 drops of Hercules No. 340 antifoam agent. The terpolymer had an inherent viscosity greater than 1.0 (measured at 0.5% in acetone which contained 1% water). The entire blend was mixed in a Homomixer (high shear device) for 3 minutes. The dispersion was then deaerated under vacuum and the Brookfield viscosity was determined to be 2380 cps. at 10 rpm and 630 cps. at 100 rpm.

The slurry composition was then cast onto a "Teflon" sheet under a rigid blade. After 48 hours air-dry at room temperature, the sheet was a white, homogeneous, tough and flexible film. A similar sheet was prepared and heated to 120° C. for 5 minutes to thermoset the resultant film.

EXAMPLE 2

A slip composition was prepared by adding a mixture of 190 grams alumina powder (of Example 1) and 10 grams talc (of Example 1) to an aqueous dispersion containing the following: (a) 20 grams of the aqueous terpolymer dispersion used in Example 1, (b) 0.15 grams trisodium polyphosphate wetting agent, (c) 63 grams water and (d) 4 drops of Hercules No. 340 antifoam agent. The entire blend was mixed in a Homomixer (high shear device) for 3 minutes. The dispersion was then deaerated under vacuum and the Brookfield viscosity was determined to be 2380 cps. at 10 rpm and 630 cps. at 100 rpm.

The slurry composition was then cast onto a "Teflon" sheet under a rigid blade. After 48 hours air-dry at room temperature, the sheet was a white, homogeneous, tough and flexible film. A similar sheet was prepared and heated to 120° C. for 5 minutes to thermoset the resultant film.

EXAMPLE 3

A slurry composition was prepared by mixing a mixture of 190 grams alumina (of Example 1) and 10 grams talc (of Example 1) with 20 grams of an aqueous dispersion containing 80% vinyl acetate/17% ethylene/3% N-methylol acrylamide terpolymer (49% polymer solids), 0.04 grams oxalic acid catalyst and 78 grams water. The terpolymer had an inherent viscosity of 1.29 (measured as in Example 1). The results are similar to those of Example 2. Air dried and thermoset films were prepared as in Examples 1 and 2.

EXAMPLE 4

A slurry composition was prepared in accordance with Example 2 except that the dispersion of internally plasticized thermosetting resin was "X-Link" 2873, a product of National Starch and Chemical Corporation; 130 grams water were added. "X-Link" 2873 is an aqueous dispersion (pH 4.4, containing 45% solids) of a vinyl acetate/acrylic ester copolymer having a nominal particle size of 0.20 micron (pamphlet entitled "X-Link Seld-crosslinking Resins," Copyright 1965, National Starch and Chemical Corporation). The results were similar to Example 2 although the film was somewhat weaker. Air dried and thermoset films were prepared as in the previous Examples.

EXAMPLE 5

A slurry composition was prepared in accordance with Example 2 except that the internally plasticized thermosetting resin was "Rhoplex" E-32, a self-crosslinking acrylic emulsion containing 46% solids, pH 3.2, of Rhom & Haas Co., 110 grams of water were required for viscosity control. "Rhoplex" E-32 is described in Rohm & Haas Bulletin TP-1259 available in 1967 or before. Air dried and thermoset films were prepared as in the previous Examples.

EXAMPLE 6

An alternative method of preparing this slip composition, in which the particulate is predispersed before final mixing with the aqueous thermosetting resin is illustrated in this example.

A mixture of 380 grams alumina powder (of Example 1) and 20 grams talc (of Example 1) was added to a solution of 160 grams water, 80 grams of a 2% solution of "Methocel," (methylcellulose grade 90 HG-DG-4000 Dow Chemical Company) and 3 drops of Hercules antifoam No. 357. The mixture was then subjected to high shear for 5 minutes and then relieved of dissolved and dispersed air by moderate stirring at 82°–85° C. for 10 minutes, cooling to 45° C. and applying vacuum with stirring at this lower temperature. Bubble release was encouraged by alternation of vacuum and vacuum release. After about 30 minutes, the foam was completely eliminated. At this point 40 grams "Rhoplex" E-32 aqueous dispersion containing 1 drop of antifoam was slowly added to the particulate dispersion, with gentle stirring in such a way that no bubbles were formed. Films were cast and dried; the results showed homogeneous tough flexible films from this method.

Squares (1 inch by 1 inch) were stamped out of the cast films and screen printed with conductive inks. The ultimate structure was fired to produce a printed circuit. Also as many as five 1 inch by 1 inch squares were stacked with conductive inks printed on each layer, laminated at about 10,000 psi and fired at 1650° C. to produce a monolithic ceramic structure containing buried conductors.

EXAMPLE 7

The dimensional stability and the electrical properties of the ceramic articles of this invention were tested and found to be excellent. The results are shown below in Tables II and III.

Onto a 1 inch by 1 inch prefired ceramic chip, a conductive pattern was made on both sides by screen printing a silver composition and firing at 750° C. for 5 minutes. Leads were then applied using a 60/40 lead/tin solder. The dissipation factor was determined; generally, values below 0.001 are considered satisfactory. The differential shrinkage was determined. This is the difference in the length and the width of the 1 inch by 1 inch stamped-out film after firing at 1650° C.

TABLE II

| SAMPLE | TREATMENT | SHRINKAGE (%) | DIFFERENTIAL SHRINKAGE (%) | DISSIPATION FACTOR |
| --- | --- | --- | --- | --- |
| Example 1 | air-dried, then baked | 20.0 ± 0.0 | 0.0 | 0.0006 ± 0.0001 |
| Example 1 | bake-dried directly | 20.8 ± 0.1 | 0.2 | N.D. |
| Example 3 | air-dried then baked | 20.3 ± 0.05 | 0.1 | 0.0005 ± 0.00005 |
| Example 5 | air-dried, then baked | 20.0 ± 0.05 | 0.1 | 0.0005 ± 0.00005 |

Strips of the air-dried and thermoset films were tested for solvent stability and swelling resistance by soaking the air-dried and thermostat films of Examples 1–5 in cyclohexanone for two hours, and measuring the percentage of swelling.

TABLE III

| SAMPLE | PERCENT SWELLING AIR DRIED | THERMOSET |
| --- | --- | --- |
| Example 1 (no catalyst) | high* | 2 |
| Example 2 (with catalyst) | high* | 2 |
| Example 3 (with catalyst) | high* | 20 |
| Example 4 | 50% | 8 |
| Example 5 | 50 | 12 |

*The air-dried films were swollen beyond measurement and disintegrated on handling.

EXAMPLE 8

A slurry composition was prepared by adding a mixture of 285 grams alumina powder (of Example 1) and 15 grams talc (of Example 1) to 20 grams of the aqueous terpolymer dispersion used in Example 1; 0.04 grams oxalic acid was also added as well as 2 drops of Hercules No. 90 antifoam agent and 90 grams water. The blend was mixed as before, giving a dispersion of viscosity 4800 cps. at 10 rpm and 1500 cps. at 100 rpm. This dispersion tended to thicken up on standing, so an additional 30 grams of water was added. The resulting dispersion flowed well and had somewhat higher viscosity than that of Example 1. The cast film was tough with good gloss, but air bubbles were harder to remove than from the film of Example 1. The initial modulus of the green film after air-drying at room temperature for 48 hours was below 15,000 p.s.i.

Comparative Example 1

In this comparative showing a green tape was prepared according to the process of above-mentioned U.S. Pat. No. 2,966,719, that is, using a nonaqueous vehicle and thermoplastic (not internally plasticized thermosetting) resin soluble in said nonaqueous vehicle. A mixture of two thermoplastic resins was employed to minimize blistering and cracking on evaporation of the cast mixture.

The slurry composition containing 85.4 weight percent inorganics was prepared by adding a mixture of 190 grams alumina (of Example 1) and 10 grams talc (of Example 1) to 190 ml. of a binder solution of thermoplastic resins in organic solvents; the binder solution consisted of 8.6 ml. butyl cellosolve, 30 ml. Union Carbide "Carbowax" 200 solid polyethylene glycols (assumed to remain as a permanent external plasticizer), 20 grams Du Pont "Elvacite" 2008 copolymer of methyl methacrylate (99%) and methacrylic acid (1%), 30 grams Monsanto "Gelva" polyvinyl acetate and sufficient ethylene dichloride to produce 500 ml. of solution. The resultant solution was cast on a smooth surface and air-dried for 48 hours at room temperature to evaporate the solvent. The resultant film was quite brittle and had an initial modulus of 39,000 p.s.i.

EXAMPLE 9

This example shows the use of a Hobart mixer in preparing the slurry. This mixer gives excellent dispersions in shorter times (about 1 hour) when compared to conventional ball milling times of about 16 hours. The Hobart mixer is a planetary type mixer manufactured by the Hobart Manufacturing Company, Troy, Ohio.

A slurry composition was prepared by adding 6840 grams alumina powder (of Example 1), 360 grams talc (of Example 1), and 2139.6 grams of a 1% solution of "Methocel" (of Example 6) to 118.4 grams of water in the Hobart mixer. The mixture was stirred for 2-3 minutes at low speed (about 100 rpm) to begin mixing the materials and then switched to medium speed (about 200 rpm) for 20 minutes. The side of the pot was manually scraped every 5 minutes to ensure thorough mixing. After 20 minutes, 40 ml. of water containing 4.10 grams of "Tamol SN" (dispersing agent, Rohm & Haas, a neutral sodium salt of a condensed arylsulfonic acid) were added and the mixture stirred for 20 more minutes. Then 1092 grams of water were added and stirred at low speed for 5 minutes. This last water addition adjusts the viscosity to about 500 cps. (20 rmp, 25° C.) which is a convenient value for de-airing and casting. The slurry was de-aired by transferring the slurry to beakers and stirring slowly to allow air to come to the surface. Bubble removal at the surface was aided by adding 4 drops of octyl alcohol to the slurry. After de-airing (about 2 hours) the slurry is ready to receive the binder. In this case the slurry was stirred overnight for convenience; 933 grams (88.5%) of "Rhoplex" HA-12 were added and stirred in gently for about 1 hour. The slurry was cast on polyethylene under a rigid blade. The wet film thickness varied from 0.010 inch to 0.023 inch and the dried film varied from 0.005 inch to 0.018 inch. The dry sheet was white, homogeneous, tough and flexible.

Comparative Example 2

This example teaches that coarse alumina powder is not acceptable.

Alumina powder ("Alcoa" A-3) with a particle size distribution (according to vendor literature) of 4–15% greater than 100 mesh (149 microns); 50–75% greater than 200 mesh (74 microns); 88–98% greater than 325 mesh (44 microns); and 2–12% through 325 mesh was used as described in Example 9. The slurry was too dry and 200 grams of additional water were added. The mix was discarded because it was too thick and coarse for casting.

Thus, this invention provides from an aqueous system unfired ceramic sheets having excellent storage stability, flexibility, insensitivity to solvents and humidity and compatibility with a wide variety of printing compositions. The fired ceramic articles of this invention are useful as substrates for the attachment of various circuit elements which have many utilities in the electronics field.

I claim:

1. In a process for preparing green flexible films by casting films on a supporting surface with dispersions of ceramic particulate matter, resins and liquid and drying to form a green sheet, the improvement of casting such films with a slurry composition adapted for the formation of flexible green ceramic articles which have an initial modulus below 20,000 psi and which have excellent dimensional stability and solvent resistance, said composition comprising ceramic particulate matter blended with an aqueous dispersion of an internally plasticized thermosetting resin, said resin containing from 0.1 to 10 weight percent of a comonomer which after polymerization is capable of cross-linking the polymer by heat treatment and (a) from 50 to 95 weight percent vinyl acetate, and from 4.9 to 49.9 weight percent of an internally plasticizing comonomer; (b) from 50 to 98 weight percent of an ester of a 1 to 8 carbon atom alcohol and acrylic acid and the remainder a plasticizing comonomer; or (c) from 50 to 84.9 weight percent ethylene and from 15 to 49.9 weight percent of a plasticizing comonomer, there being from 85 to 97 parts of said ceramic particulate matter and from 3 to 15 parts of said resin, the ceramic particulate matter having a particle size no larger than 44 microns then heating the film at from about 50 to about 150° C. to remove the aqueous medium and to cause the resin to cross-link whereby a flexible film loaded with ceramic particulate matter, having excellent dimensional stability and solvent resistance is provided.

2. The process of claim 1, wherein the resin is resin (a).

3. The process of claim 2 wherein the plasticizing comonomer is selected from the class consisting of ethylene, esters of 1 to 8 carbon atom alcohols and any of maleic acid, fumaric acid, or acrylic acid and esters of 4 to 8 carbon atom alcohols and methacrylic acid.

4. The process of claim 1 wherein the resin is resin (b).

5. The process of claim 4 wherein the plasticizing monomer is selected from the class consisting of ethylene, esters of 1 to 8 carbon atoms alcohols and either maleic acid or fumaric acid and esters of methacrylic acid and an alcohol having up to 8 carbon atoms but having at least 2 more carbon atoms than the alcohol portion of the acrylic acid ester.

6. The process of claim 5 wherein the acrylic ester comonomer comprises from 50 to 75 weight percent of the copolymer.

* * * * *